United States Patent [19]

Kerr et al.

[11] Patent Number: 5,125,042
[45] Date of Patent: Jun. 23, 1992

[54] DIGITAL IMAGE INTERPOLATOR USING A PLURALITY OF INTERPOLATION KERNALS

[75] Inventors: Richard Kerr; Robert Krogstad, both of Rochester, N.Y.

[73] Assignee: Eastman Kodak Company, Rochester, N.Y.

[21] Appl. No.: 701,627

[22] Filed: May 14, 1991

Related U.S. Application Data

[63] Continuation of Ser. No. 367,168, Jun. 16, 1989, abandoned.

[51] Int. Cl.[5] .................... G06K 9/42; G06K 9/36; G06F 7/38
[52] U.S. Cl. ........................... 382/47; 382/41; 358/428; 364/723
[58] Field of Search .............. 382/47, 41; 358/428, 358/451; 364/723, 577, 413.18, 474.31

[56] References Cited

U.S. PATENT DOCUMENTS

| | | | |
|---|---|---|---|
| 4,468,693 | 8/1984 | Fujita et al. | 358/78 |
| 4,578,812 | 3/1986 | Yui | 382/41 |
| 4,595,958 | 6/1986 | Anderson Jr. et al. | 358/296 |
| 4,661,987 | 4/1987 | Anderson et al. | 364/723 |
| 4,682,300 | 7/1987 | Seto et al. | 364/571 |
| 4,700,232 | 10/1987 | Abt et al. | 356/183 |
| 4,703,353 | 10/1987 | David | 382/47 |
| 4,725,892 | 2/1988 | Suzuki et al. | 358/451 |
| 4,790,028 | 12/1988 | Ramage | 382/47 |
| 4,819,190 | 4/1989 | Hinman et al. | 382/47 |

FOREIGN PATENT DOCUMENTS

0070677 7/1982 European Pat. Off. .
0183201 11/1985 European Pat. Off. .

OTHER PUBLICATIONS

"Cubic Convolution Interpolation of Digital Image Processing", by Robert G. Keys, IEEE Transactions on Acoustics, Speech and Signal Processing, vol. ALS, p. 29, No. 6, Dec. 1981, pp. 1153-1160.

Primary Examiner—Leo H. Boudreau
Assistant Examiner—Michael Cammarata
Attorney, Agent, or Firm—William F. Noval

[57] ABSTRACT

An interpolator for enlarging or reducing a digital image includes an interpolation coefficient memory containing interpolation coefficients representing a one dimension interpolation kernel. A row interpolator receives image pixel values, retrieves interpolation coefficients from the memory, and produces interpolated pixel values by interpolating in a row direction. A column interpolator receives multiple rows of interpolated pixel values from the row interpolator, retrieves interpolation coefficients from the memory, and produces rows of interpolated pixel values by interpolating in a column direction.

10 Claims, 16 Drawing Sheets

DIGITAL IMAGE INTERPOLATOR USING A PLURALITY OF INTERPOLATION KERNALS

This is a continuation of application Ser. No. 367,168, filed Jun. 16, 1989, now abandoned.

CROSS-REFERENCE TO RELATED APPLICATION

Reference is hereby made to U.S. patent application Ser. No. 367,177, now abandoned entitled "Digital Image Interpolator with Undersamples Interpolation Kernel" by R. Kogstad, and application Ser. No. 368,458 now U.S. Pat. No. 5,008,757 entitled "Digital Image Interpolator with Multiple Interpolation Algorithm" by L. VanNostrand, both filed on even data herewith.

TECHNICAL FIELD

The present invention relates to interpolators for processing digital images, and more particularly to such interpolators for high speed processing of digital images, such as diagnostic x-ray images to magnify or reduce such images.

BACKGROUND ART

U.S. Pat. No. 4,595,958 issued Jun. 17, 1986 to Anderson Jr. et al. discloses a process of recording one or more digital images on a hardcopy output medium such as photographic film or paper. In the process of recording the digital images, they may be enlarged or reduced by interpolation to fill the available output medium. Although one interpolation algorithm is disclosed (i.e. linear interpolation) no specific hardware for performing the interpolation is described.

U.S. Pat. No. 4,578,812 issued Mar. 25, 1986 to Yui discloses hardware for performing high speed two-dimensional interpolation on a digital image by the method of cubic convolution. In the two-dimensional cubic convolution interpolation algorithm implemented by the hardware, sixteen pixels from the original image surrounding an interpolation site in a two-dimensional array are simultaneously multiplied by 16 corresponding interpolation coefficients (weight factors) and the 16 products are added to produce the interpolated value at the interpolation site. The interpolation coefficients represent samples of a two-dimensional cubic convolution interpolation kernel, and are stored in a digital memory. The cubic convolution kernel is sampled at a granularity of $32 \times 32$ samples between original pixels. The samples are stored as 12-bit values. As a result, the total storage requirements for the interpolation coefficients is $32 \times 32 \times 12 \times 16 = 196,608$ bits, where the "16" indicates the 16 coefficients applied to the 16 pixel values to obtain the interpolated value. The storage requirement is thus about 192K bits for the interpolation coefficients.

For high resolution images, such as diagnostic x-ray images, it is desirable to sample the cubic convolution kernel at a much finer granularity, say $256 \times 256$, and to record the coefficients to a higher accuracy, say 16 bits, to provide a more accurate interpolation, and finer divisions between magnification choices. This would require $256 \times 256 \times 16 \times 16$ which approximately equals 16M bits of read only memory for storing the interpolation coefficients. The provision of such a large amount of read only memory would be very costly and difficult to address.

Furthermore, it is known that for certain types of images cubic convolution does not produce an optimum interpolated image and other interpolation algorithms such as linear or replication are preferred. It is therefore the object of the present invention to provide apparatus for performing cubic convolution interpolation on a digital image that overcomes the shortcoming noted above. It is a further object of the invention to provide interpolation apparatus that can also be employed to perform other types of interpolation such as linear and replication.

DISCLOSURE OF THE INVENTION

The object is achieved according to the present invention by providing a digital image processor for performing two-dimensional interpolation, having an interpolation coefficient memory containing interpolation coefficients representing a one-dimensional interpolation kernel. A row interpolator connected to the memory receives image pixel values along a row, retrieves interpolation coefficients from the memory, and produces interpolated pixel values by interpolating in the row direction. A column interpolator connected to the memory and to the row interpolator receives rows of interpolated pixel values from the row interpolator, retrieves interpolation coefficients from the coefficient memory, and produces rows of intepolated pixel values by interpolating in a column direction. In a preferred embodiment of the invention, the interpolation coefficient memory contains a plurality of interpolation kernels for performing different types of interpolation such as cubic convolution, linear, and replication, and the interpolator includes a logic and control unit for selecting one of the interpolation kernels in response to an operator input. According to a further feature of the invention, the interpolation coefficients are stored in a plurality of banks in the memory, and the banks are simultaneously addressed to return a plurality of coefficients, one coefficient from each bank. According to a further aspect of the invention, the row interpolator includes control means for replicating the first and last pixel in a row in an image so that interpolation values can be computed between the first and second pixels of an image row, and between the last and next to last pixels of a row. Similarly, the column interpolator includes control means for replicating the first and last rows of an image for interpolating between the first and second rows, and between the last and next to last rows of an image.

MODES OF CARRYING OUT THE INVENTION

Figure 1:
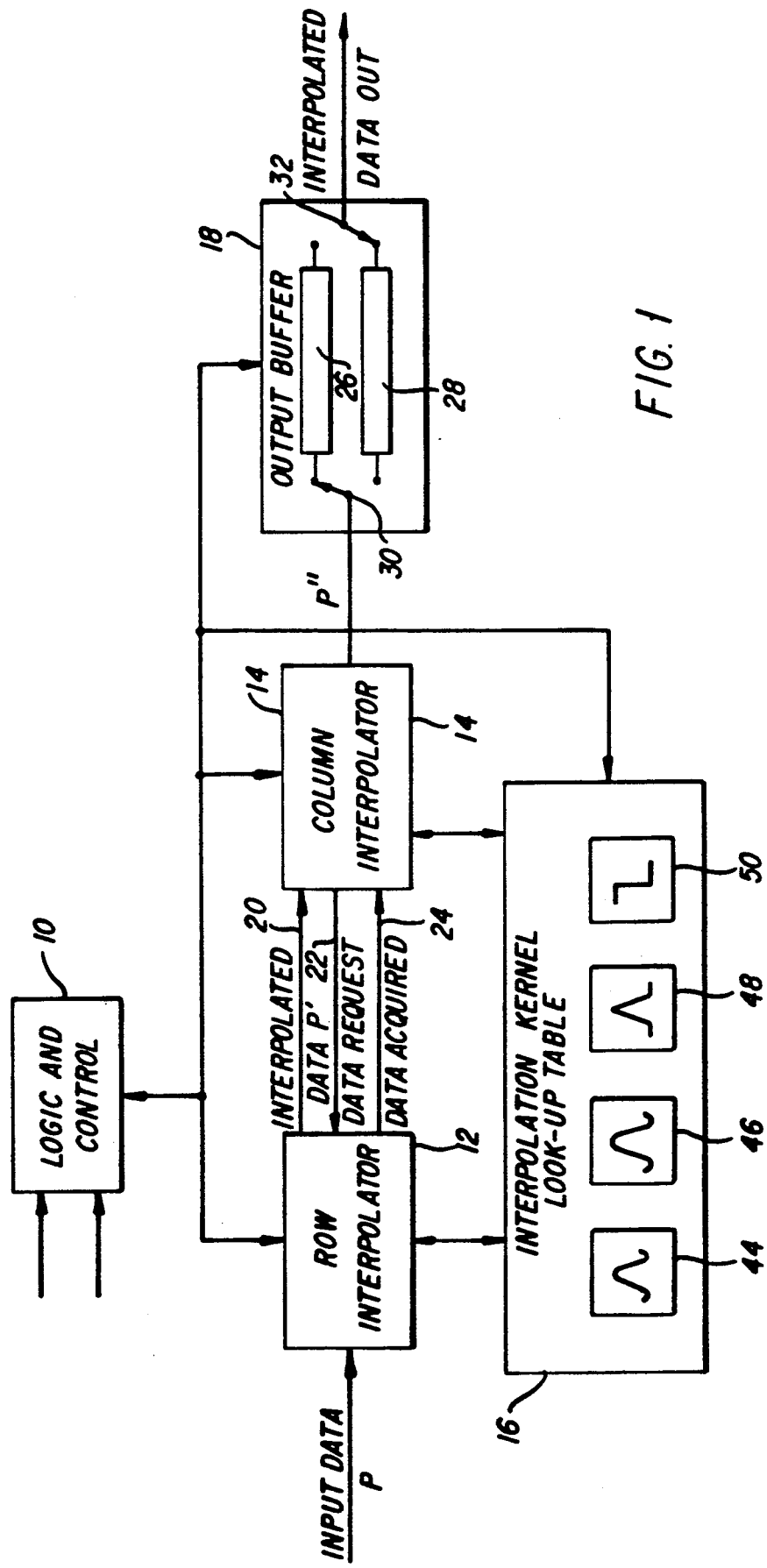
FIG. 1 is a block diagram of an interpolator according to the invention.

FIG. 1 is a schematic block diagram showing an interpolator according to the present invention. The interpolator receives digital image pixel data, for example from a frame store memory (not shown), one row at a time, and produces interpolated digital image data one row at a time which can be supplied to a printer (not shown) or stored for future use for example in a frame store. The interpolator includes a logic and control unit 10 which calculates a horizontal sampling increment $h_H$ and a vertical sampling increment $h_v$ for the output images and controls the overall operation of the interpolator. The sampling increment h is determined by magnification factors that can represent expansion, reduction, or no change in the number of pixels in the image in the horizontal and vertical directions. The interpolator includes a row interpolator 12, a column interpolator 14, an interpolation kernel lookup table 16, and an output buffer 18. In operation, the logic and control unit 10 receives instructions regarding the number and size of input images to be printed on a particular output format, and calculates magnification factors to be applied to each image, based on the number of pixels in the original image, and the number of pixels to be provided in the interpolated output image. The row interpolator 12 retrieves pixel values along a row and interpolates pixel values P' between them by retrieving interpolation coefficients from the one-dimensional interpolation kernel lookup table 16. The row interpolator multiplies the pixel values by their respective interpolation coefficients and sums the product to produce the interpolated values. The interpolated pixel values P' from the row interpolator are supplied upon request to the column interpolator 14 on line 20. The column interpolator 14 requests data on line 22 and when the row interpolator 12 supplies the data, an acknowledgment is supplied on line 24.

The column interpolator 14 acquires and stores several rows of interpolated pixel data until it can start performing interpolation in a column direction on the stored data. When sufficient data has been acquired, the column interpolator 14 begins interpolating in a column direction to produce rows of interpolated values P'' between the rows supplied by the row interpolator 12.

The column interpolator 14 interpolates in a column direction by selecting a plurality of pixel values arranged in a column from the acquired rows, retrieving a corresponding plurality of interpolation coefficients from the lookup table 16, and performing multiplication and addition of the products in a manner similar to the row interpolator 12. The column interpolator 14 provides rows of interpolated pixel values P'' to the output buffer 18, which is double buffered so that a row of interpolated pixel values can be read out while the next row is being read into the output buffer 18. Double buffering is produced as is known in the art by a pair of buffers 26 and 28 and multiplex switches 30 and 32.

One-dimensional interpolation by use of the coefficients stored in lookup table 16 will now be described. Interpolation can be described as:

$$P'(x) = \sum_{k=-1}^{2} P_k \cdot C\left(\frac{x - x_k}{h}\right) \quad (1)$$

where P' (x) represents the interpolated value, $$C\left(\frac{x - x_k}{h}\right)$$

is a value of the interpolation kernel at location $(x - x_k)$; h is the sample increment of the interpolated function, $x_k$ represents the location of the samples of input data (also called interpolation nodes) and $P_k$ are the values of the input data at the interpolation nodes.

Figure 2:
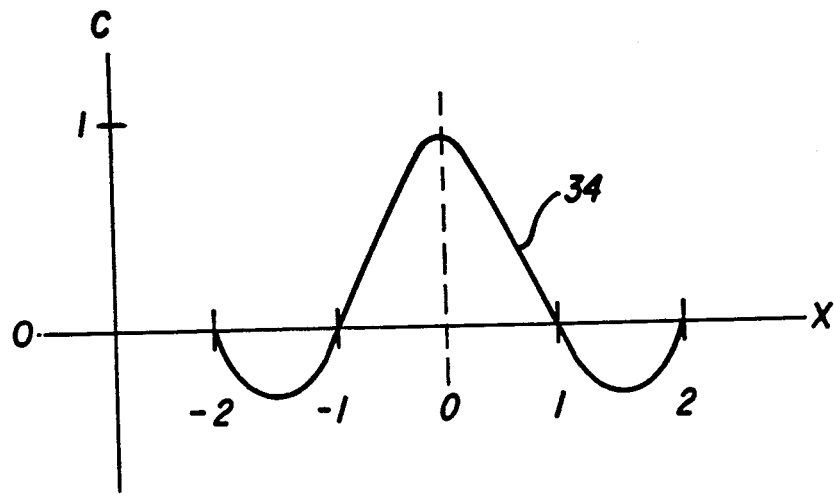
FIG. 2 is a graph showing a cubic convolution interpolation kernel.

The interpolation kernel is a continuous function that converts sampled data into a continuous function, the resulting continuous function can then be resampled to obtain the interpolated sample values. Cubic convolution employs a kernel that is defined by piecewise cubic polynomials defined on the subintervals $(-2, -1)$, $(-1,0)$, $(0,1)$, and $(1,2)$. Outside the interval $(-2,2)$ the kernel is zero. Evaluation of equation 1 for the cubic convolution kernel requires four consecutive data samples from the original image data. FIG. 2 is a graph showing the cubic convolution kernel 34 defined on the interval $(-2,2)$. The scale of the X axis in FIG. 2 is equivalent to the spacing of the data samples in the original image.

Figure 3:
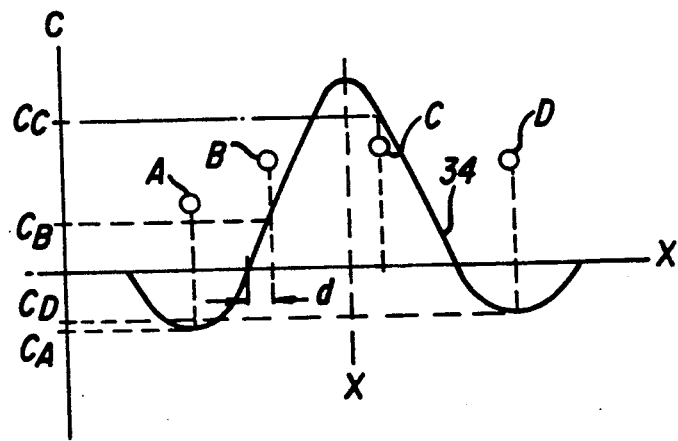
FIG. 3 is a graph useful in describing the method of interpolation by cubic convolution.

FIG. 3 illustrates how the interpolation kernel 34 is employed to compute an interpolated value at location x. Four consecutive data values from the original image data are shown as A, B, C, and D. To produce an interpolated value at location x, the interpolation kernel 34 is centered at x, and the values of the kernel are calculated at the locations of the original data samples. These values $C_A$, $C_B$, $C_C$, and $C_D$ are the interpolation coefficients. The interpolated value at x is:

$$P(x) = (A \cdot C_A) + (B \cdot C_B) + (C \cdot C_C) + (D \cdot C_D). \quad (2)$$

Figure 4:
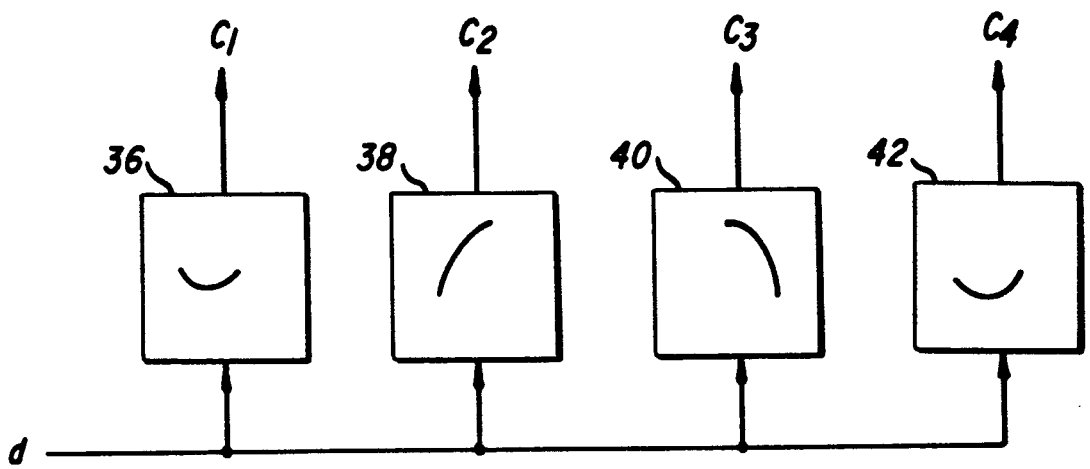
FIG. 4 is a schematic block diagram showing the arrangement of the interpolation coefficient memory.

A value at any location between original sample points B and C can be computed in this manner. To avoid the necessity of calculating the values of the interpolation coefficients each time an interpolated value is produced, the coefficient values are calculated from the piecewise cubic polynomials defining the kernel, and stored in the lookup table 16 (see FIG. 1). In a preferred mode of practicing the invention, the kernel is evaluated at 1,024 points to 16-bit accuracy. The resulting 1,024 coefficients are divided into four groups, representing the four segments of the kernel between $(-2,-1)$, $(-1,0)$, $(0,1)$, and $(1,2)$, each group having 256 coefficients. The four groups are stored in four banks of memory which can be simultaneously addressed by a displacement value d that represents the distance from the zero in the kernel $-1$ to the sample B. The arrangement of the interpolation kernel lookup tables is shown in FIG. 4, where the first memory bank 36 contains the 256 coefficients that define the kernel on the interval $(-2,-1)$, which is shown graphically in the Figure. Similarly the second memory bank 38 contains the group of coefficients representing the portion of the convolution kernel from $(-1,0)$, and so on for memory banks 40 and 42. As shown in FIG. 4, a displacement value d is simultaneously applied to all four memory banks to produce coefficients $C_1$, $C_2$, $C_3$, and $C_4$. Returning now to FIG. 1, the interpolation kernel lookup table may contain kernels for any number of other types of interpolation such as linear and replication, in addition to different types of cubic convolution. In the preferred embodiment of the invention, the lookup table 16 contains two cubic convolution kernels, one with a $=-1$ (44) and one with a $=-0.5$ (46), where a is a constraint applied to the interpolation kernel polynomials when the kernel is defined as follows:

$$C(s) = \begin{cases} (a+2)|s|^3 - (a+3)|s|^2 + 1 & 0 < |s| < 1 \\ a|s|^3 - 5a|s|^2 + 8a|s| - 4a & 1 < |s| < 2 \\ 0 & 2 < |s|. \end{cases} \quad (3)$$

Figure 5:
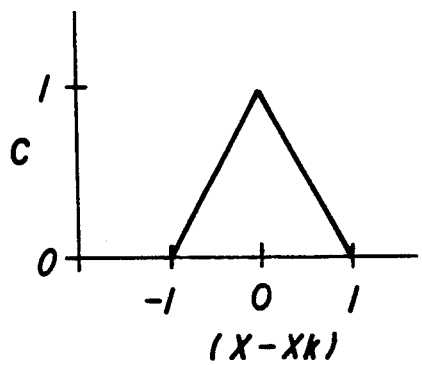
FIG. 5 is a graph illustrating a linear interpolation kernel.
Figure 6:
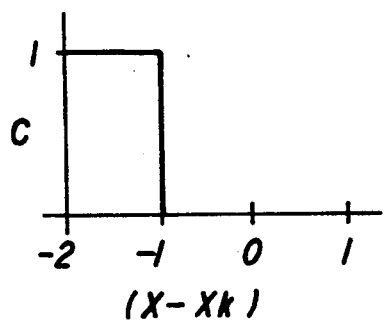
FIG. 6 is a graph illustrating replication interpolation kernel.

The interpolation lookup table also contains a kernel for linear interpolation (48) and a kernel for replication (50). The kernel for linear interpolation is shown in FIG. 5, and is graphically represented as a triangular waveform in the interval $(-1,1)$ and zero elsewhere. The kernel for replication is shown in FIG. 6 and is graphically represented as a step function having a value of one in the interval $(-2,-1)$ and zero elsewhere. Returning to FIG. 1, the logic and control circuit 10 selects the lookup table addressed by the interpolators 12 and 14 in response to an operator input specifying the interpolation procedure that is desired. For example, it is known that replication interpolation performs better on binary images such as text, thus the nearest neighbor kernel may be selected for performing interpolation on text portions of an image.

The sampling increment h is determined by the logic and control unit 10 by first determining a magnification factor M defined as the lesser of the two ratios x'/x, y'/y, where x is the number of pixels in the original image in the horizontal direction, and x' is the number of pixels available on the output printer for printing the original image. The number of available pixels on the output medium is determined by the output format including the width of the output medium and the number of input images to be printed across the page in the output image. Similarly, y represents the number of pixels in an input image in the vertical direction and y' represents the number of pixels available to print the image in the vertical direction. The lesser of the two ratios is chosen so that the reproduced image will not be cropped. The sampling increment h is then determined by:

$$h = \frac{256}{M} \quad (4)$$

where the 256 in the numerator comes from the fact that the interpolation kernel has been sampled 256 times between each interpolation node. The sampling increment h is computed to an accuracy of 24 bits. Values of h between zero and 256 represent magnification, and values between 256 and 4095 represent reduction.

Figure 7:
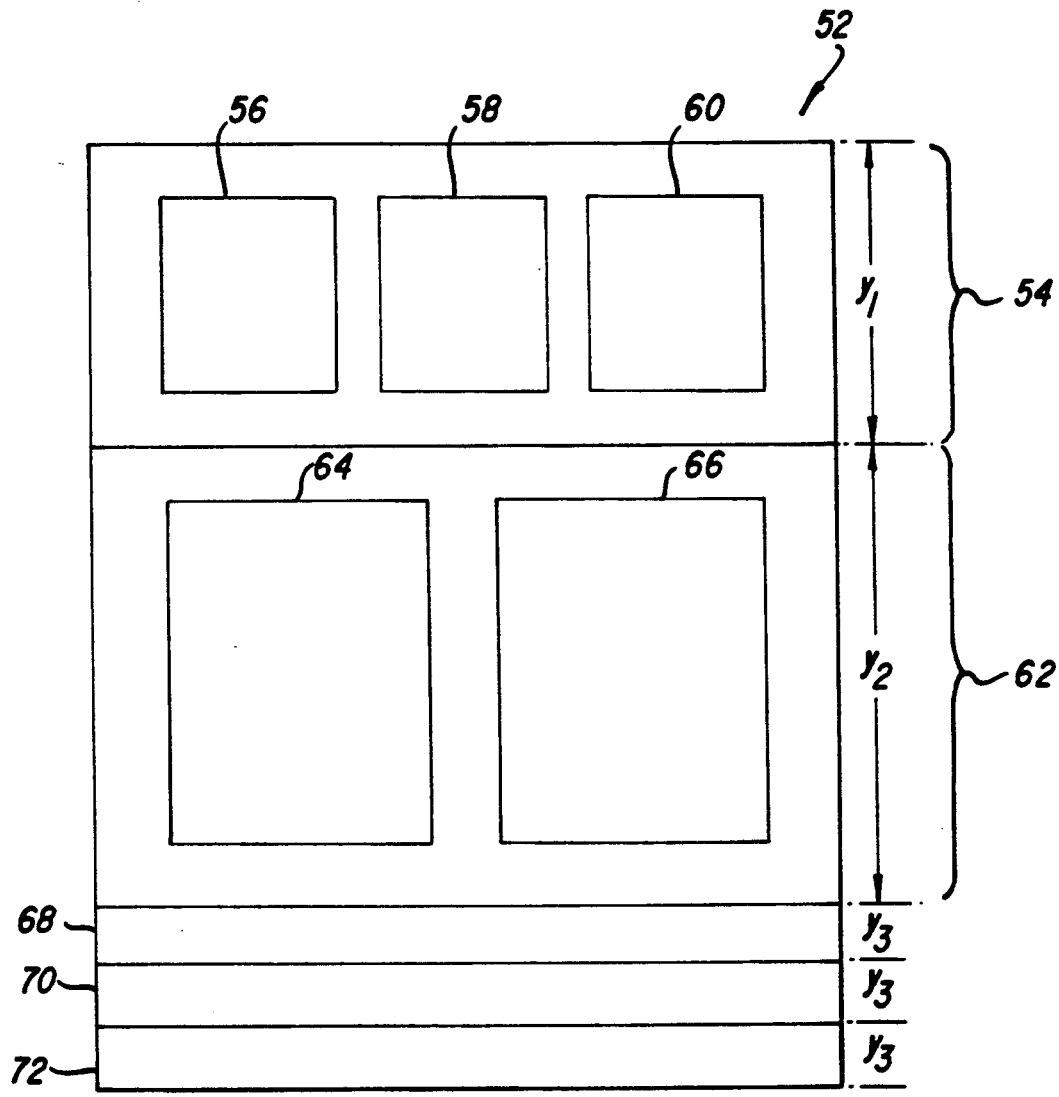
FIG. 7 is a diagram illustrating the layout of one example of an output image.

In a preferred embodiment, the output image format is selectable by the user, and comprises one or more bands. There are two types of bands, image and text. Each text band is specified by the height of the band in pixels and the number of character images in the band, and each image band is specified by the height of the band in pixels and the number of images in the band. Minimum borders and separation between the images horizontally and vertically are determined automatically by the LCU 10. An example of an output format is shown in FIG. 7. The output image 52 includes a first band 54 $y_1$ pixels high, having 3 images 56, 58, and 60, a second band 62, $y_2$ pixels high having 2 images 64 and 66, and three text bands 68, 70, and 72, each $y_3$ pixels high.

Figure 8:
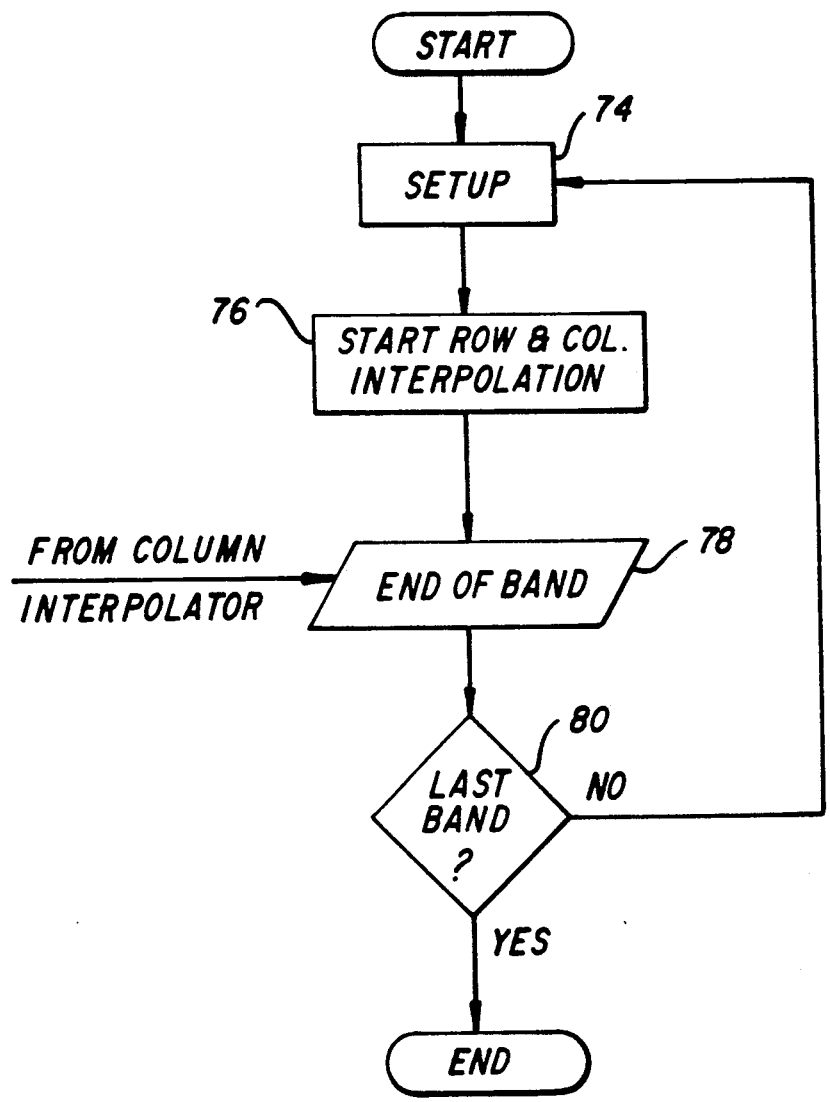
FIG. 8 is a flow chart illustrating the overall control of the interpolator shown in FIG. 1.

The overall control provided by the logic and control unit is shown in FIG. 8. The LCU 10 first performs a setup (74) calculating the horizontal and vertical sampling increments $h_H$, $h_V$ as described above. It is possible that the sampling increments are not identical due to the fact that the individual pixels may not have the same horizontal and vertical dimensions. The LCU sends the band parameters for the first band, including the horizontal and vertical sampling increments $h_H$ and $h_V$, number of lines in the band, number of images in the band, and number of input and output pixels per image to the row and column interpolators. Next, the LCU signals the row and column interpolators 12 and 14 to start interpolating (76). When an end of band signal is received (78) from the column interpolator 14, the LCU checks to see if the last band in the image has been interpolated (80). If not, a setup is performed for the next band by returning to function 74 and the process is repeated. If the last band is completed, the process is ended. The band parameters are double buffered so that the interpolation can employ one set of parameters while the next set is being loaded.

Figure 9:
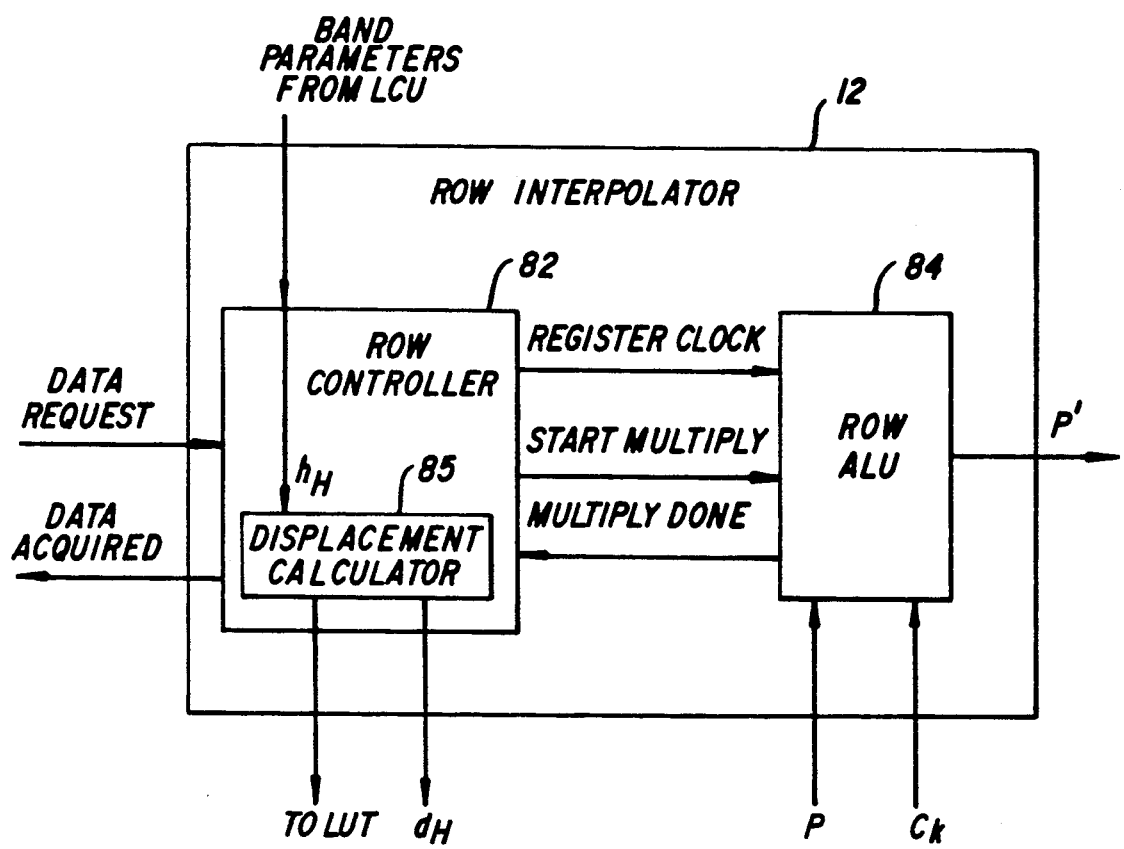
FIG. 9 is a block diagram showing the row interpolator in further detail.

The row interpolator 12 will now be described in more detail with reference to FIG. 9. The row interpolator 12 includes a row controller 82 and a row arithmetic and logic unit (ALU) 84. The row controller receives the band parameters from the LCU 10 and controls the row ALU 84. The row controller 82 includes a displacement calculator 85 that generates a displacement address $d_H$ that is an increasing multiple of the sampling increment $h_H$ across an input image, and sends the displacement address $d_H$ to the interpolation kernel lookup table 16. The row controller retrieves original image pixel values from the frame store and orders the row ALU 84 to perform interpolation calculations to produce interpolated pixel values P' and supplies the interpolated pixel values P' to the column interpolator in response to data request. The row ALU 84 receives the original values P from the frame store and the interpolation coefficients $C_k$ from the lookup table 16 and in response to a command to start from the row controller 82, calculates the interpolated values P'.

Figure 10:
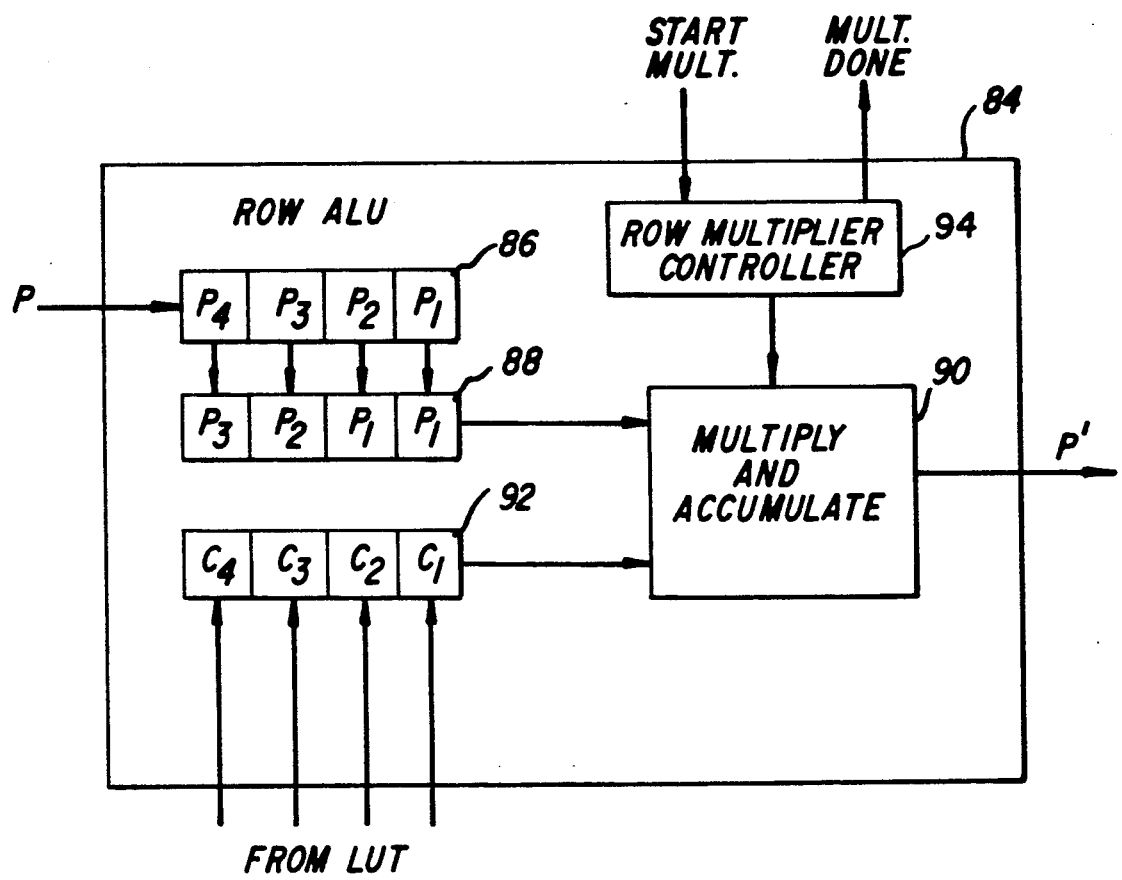
FIG. 10 is a block diagram showing the row ALU in further detail.

The row ALU 84, which is shown in more detail in FIG. 10 includes an input register 86 that receives and temporarily holds pixel values from the frame store. The pixel values are transferred in parallel from input register 86 to a working register 88, from which they can be shifted sequentially to a multiply/accumulate module 90. The four interpolation coefficients $C_1$–$C_4$ from the lookup table 16 are entered in parallel into a coefficient register 92 from which they are shifted in sequence to the multiply/accumulate module 90. A row multiplier controller 94 is slaved to the row controller 82, and upon receipt of a start multiply signal from the row controller 82, signals the multiply/accumulater module 90 to perform the multiply and accumulate operations on the data in registers 88 and 92 to compute an interpolated pixel value P' as follows:

$$P' = (C_1 \times P_1) + (C_2 \times P_2) + (C_3 \times P_3) + (C_4 \times P_4). \quad (5)$$

Figure 11:
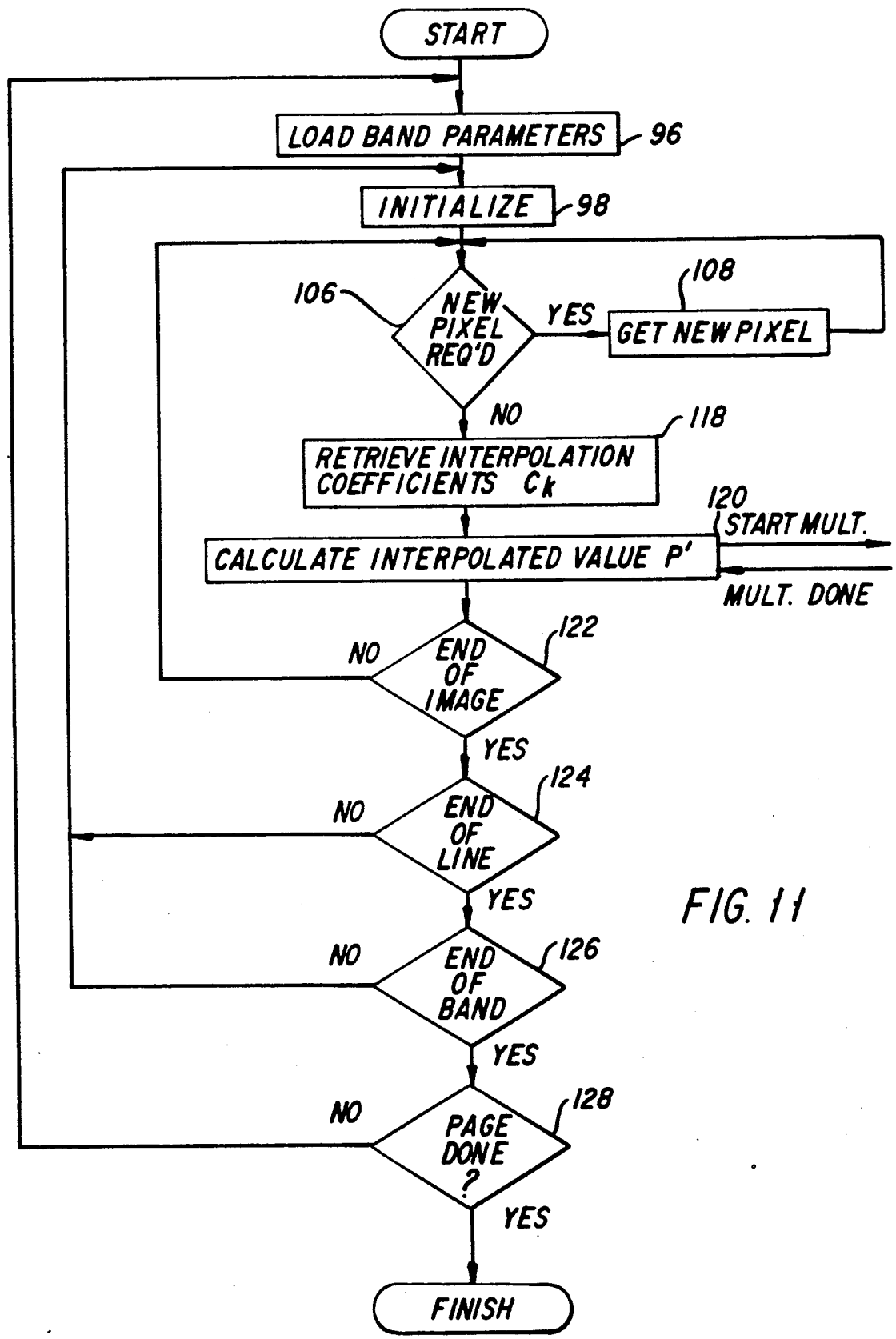
FIG. 11 is a flow chart showing the operation of the row controller.
Figure 12:
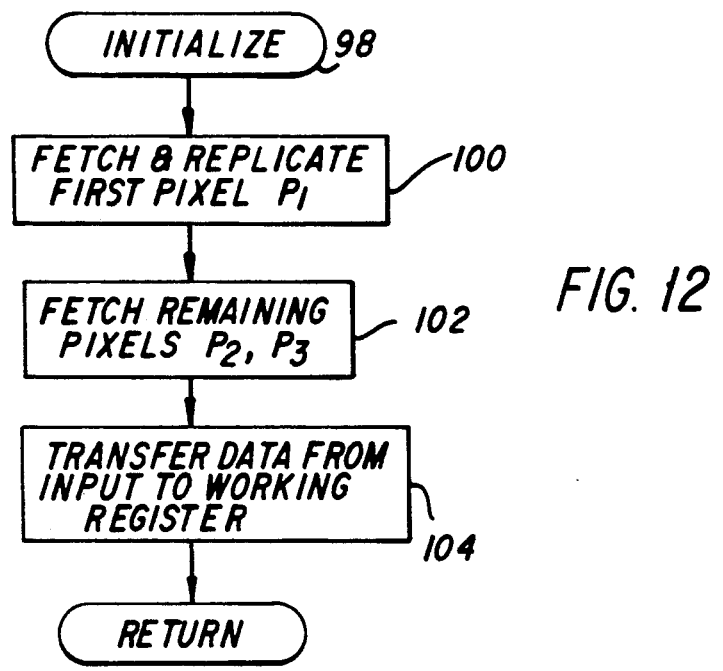
FIG. 12 is a flow chart showing the initialization function performed by the row controller.

The operation of the row controller is shown in FIG. 11. On command from the LCU 10, the row controller loads the band parameters (96) including the number of lines in the output band, the horizontal sampling increment $h_H$, the number of images in the band, and the number of horizontal pixels in the images. Next, the row controller initializes (98) the row ALU 86 by sending pixel addresses to the frame store memory. The pixels are sent from the frame store to the input register 86 in the row ALU 84. The initialization step 98 is shown in FIG. 12. To provide the interpolator with sufficient information so that interpolation can be performed between the first two pixels in a row, the first pixel $P_1$ in the row is loaded twice (100) as shown in register 88 in FIG. 10. The next two pixels in the row $P_2$ and $P_3$, are retrieved (102) from the frame store and loaded in the input register 86 of the ALU 84. Finally, the row controller 82 sends a register clock signal (104) to transfer the pixel data from the input register 86 to the working register 88 in the row ALU.

Figure 13:
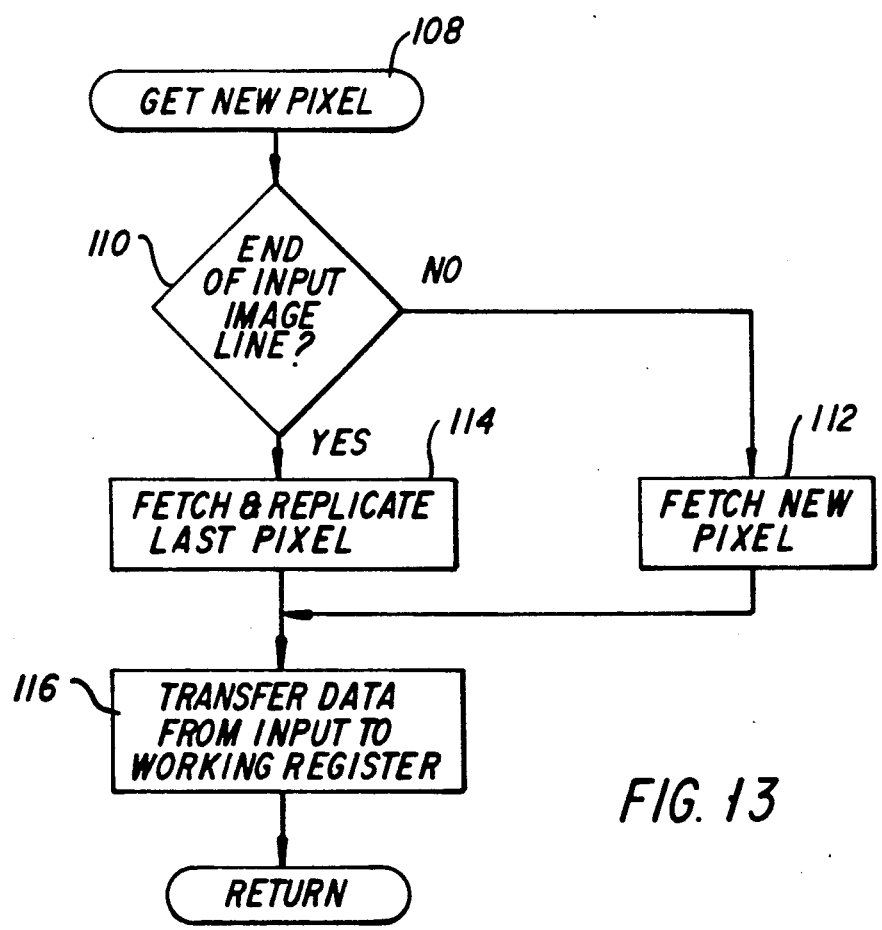
FIG. 13 is a flow chart showing the "get new pixel" function performed by the row controller.

Returning to FIG. 11, the row controller checks to see if a new pixel is required (106). If a new pixel is required, the row controller gets a new pixel (108) from the frame store as shown in FIG. 13. First a check is made (110) to determine if the end of a row in an image has been reached. If not, the next pixel in the row is fetched (112) from the frame store. If the end of the row in the image has been reached, in order to provide data for the interpolator, the last pixel in the row is replicated (114). The step of replicating the last pixel in the row can occur twice in succession until the interpolation kernel is centered on the last pixel in the row. The the pixel data in input register 86 is transferred to working register 88 (116).

Returning to FIG. 11, when a new pixel is no longer required, the four interpolation coefficients $C_1$–$C_4$ are ordered from the lookup table 16, by sending a displacement address $d_H$ to the coefficient lookup table 16 (118). The interpolation coefficients $C_1$–$C_4$ are loaded into the coefficient register 92 in the ALU 84 and the row controller 82 signals the row multiplier controller 94 to calculate an interpolated value P' by sending a start multiply signal. When the multiply accumulate operation is completed, a multiplication done signal is returned from the row multiplier controller 94. Next, the row controller checks for the end of an image (122). This is a check for the end of a line in an image and not for the last line in the image.

If the end of the image has not occurred, the row controller returns to see if a new pixel is required (106). If it is the end of the image, a check is made (124) to see if it is the end of a line (i.e. the end of a row in the last image of the band). If not, the row controller returns to initialize (98) for the next image in the band. If it is the end of the band, a check is made (126) to see if the end of the band has been encountered. If not, the row controller returns to initialize (98) for the next line in the first image in the band. If the end of the band is encountered, a check is made to see if it is the end of the page (128). If not, the row controller switches to the band parameters (96) for the next band. If it is the end of the page, the interpolation is finished for that page.

Figure 14:
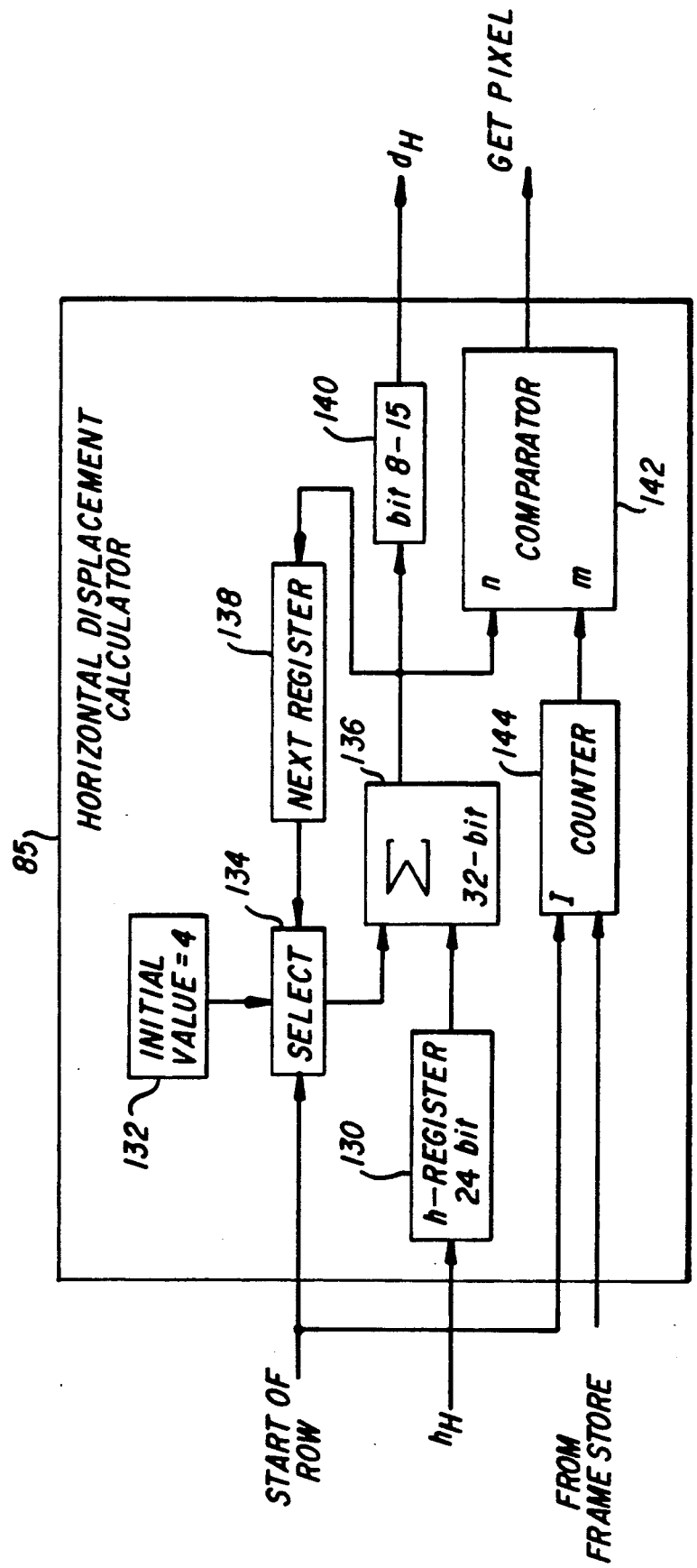
FIG. 14 is a block diagram showing the horizontal displacement calculator in the row controller.

The displacement calculator 85 that calculates the displacement value $d_H$ for addressing the lookup table 16, and determines when to get another pixel from the frame store will now be described with reference to FIG. 14.

At the beginning of a band, the value of the horizontal sampling increment $h_H$ is latched into a 24 bit data latch 130, and at the start of each line of each image, an initial value of 4, stored in a latch 132 is selected by a selector 134. The initial value and the value of $h_H$ from register 130 are summed in a summer 136. The sum is stored in a "next register" 138, the contents of which are supplied to the input of the summer 136 on the next and succeeding cycles of the displacement calculator. Bits 8–15 of the sum are extracted 140, and represent the displacement value $d_H$ employed to address the lookup table 16 to retrieve the interpolation coefficients. It is desirable to provide a nearly continuous magnification factor so that images of any size can be interpolated to images of any other size. This could be accomplished by sampling the interpolation kernel at very fine increments. However, this would require a large memory for holding the sampled interpolation coefficients. Past a certain point, increasing the sampling resolution of the interpolation kernel does not significantly improve the accuracy of the interpolation. Therefore, to provide a nearly continuous range of magnifications, while avoiding a prohibitively large coefficient table, the displacement $h_H$ is calculated to a higher precision than the interpolation kernel is sampled. In the preferred embodiment the displacement $h_H$ is calculated to 16 bit fractional accuracy (e.g. eight bits for the integer portion employed for reduction, and 16 bits for the fractional portion=24 bits) and the kernel is sampled to 8 bit accuracy (e.g. 256 samples between interpolation nodes). The address for the interpolation coefficient memory is generated by taking bits 8–15 of the sum accumulated in summer 136. This has the effect of selecting the values of the interpolation kernel at the nearest preceeding sampling location. The resulting interpolation errors are not visible in the output image. The most significant 16 bits of the sum is compared in a comparator 142 with a cumulative count from a counter 144 that is initialized to zero at the start of a row in an image, and is incremented each time a pixel is received from the frame store. As noted previously, the first pixel in a row in an input image is duplicated to provide data for interpolating between the first and second pixels, and the last pixel is duplicated twice when the end of the row is reached.

The row controller is requested to get a new pixel until the value n at the comparator 142 is equal to m.

Thereafter, each time that n becomes greater than m, a new pixel is ordered. The displacement value $d_H$ is a monotonically increasing multiple of $h_H$'s that increments each time a new interpolated value P' is calculated, and is set to zero at the start of each row of each image.

Figure 15:
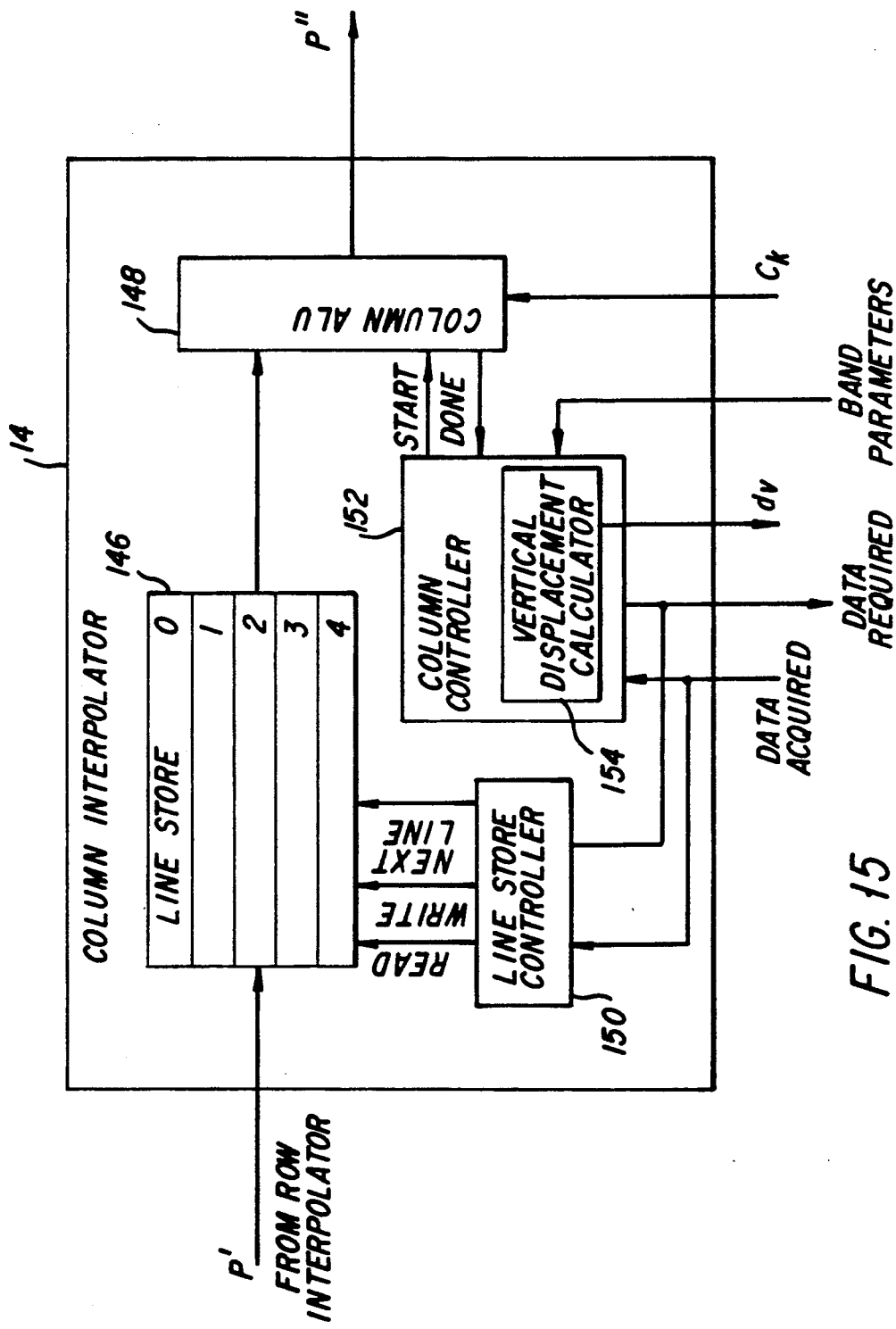
FIG. 15 is a block diagram showing the column interpolator.

The column interpolator 14 will now be described in further detail with reference to FIG. 15. The column interpolator includes five line stores 146 for receiving interpolated row data P' from the row interpolator, and supplying the row interpolated data to a column ALU 148. The column ALU 148 receives the interpolated data values from the line store 146, and interpolation coefficients $C_K$ from the lookup table 16 and performs multiply and accumulate operations similar to those performed by the row ALU 84 described previously, to produce a new interpolated value P" between rows. The values P" produced by the column ALU 148 are sent to the output buffer 18 (see FIG. 1). The loading of data into the line stores 146 from the row interpolator, and supplying data from them to the column ALU 148 is controlled by a line store controller 150. Overall control of the column interpolator 14 is provided by a column controller 152. The column controller 152 requests interpolated data from the row interpolator and includes a column displacement calculator 154 for calculating the vertical displacement values $d_v$ that are employed to address the look up table 16. The column controller 152 also signals the column ALU 148 when to start computing an interpolated value.

Figure 16:
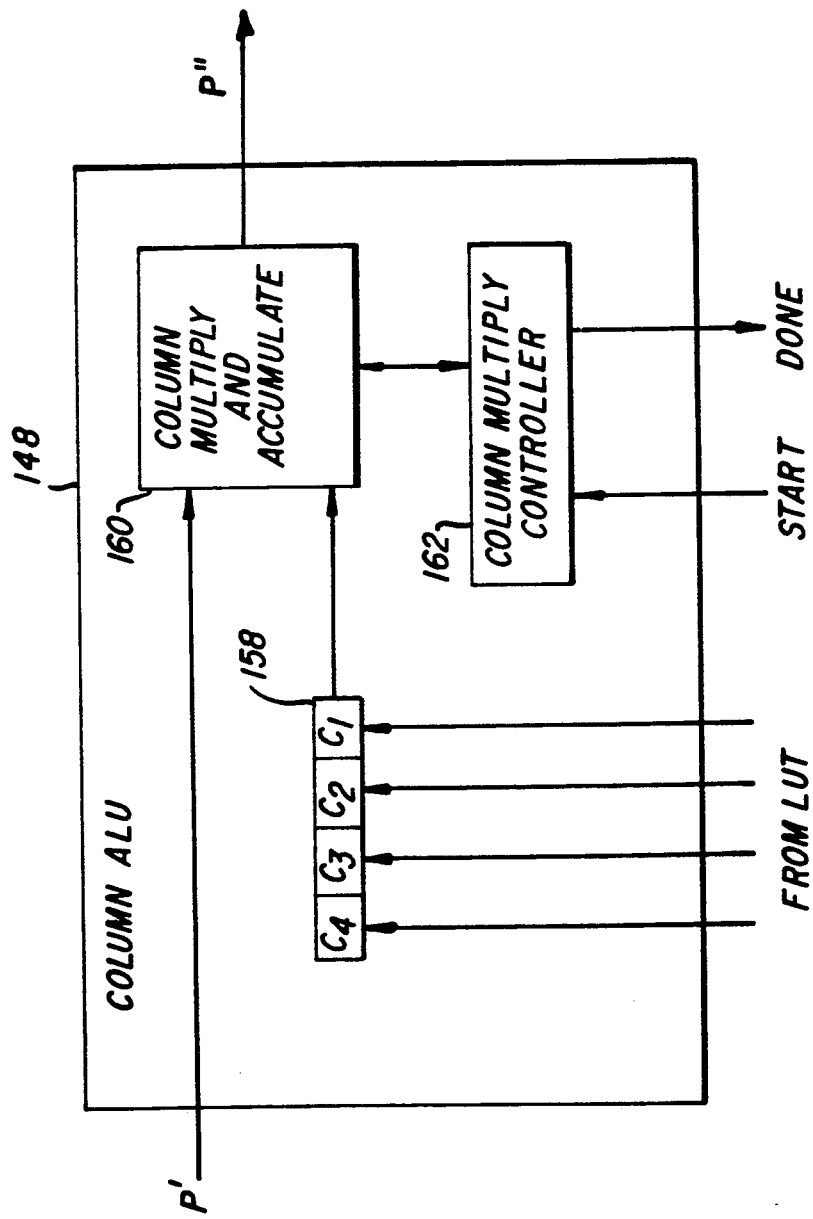
FIG. 16 is a block diagram showing the column ALU.

The structure of the column ALU 148 is shown in more detail in FIG. 16. The column ALU 148 receives interpolated row data directly from the line stores 146. Each four successive interpolated samples are from corresponding row locations in four succeeding rows of an image. A coefficient register 158 receives four corresponding interpolation coefficients $C_1-C_4$ from the lookup table 16. A multiply and accumulate module 160 receives the interpolated pixel values P' and coefficients $C_k$ and performs multiplication and summation to produce the interpolated values P" that are supplied to the output buffer 18. A column multiply controller 162 is slaved to the column controller 154, and upon receipt of a start signal from the column controller 154 causes the column multiply and accumulate module 160 to perform the computation of the interpolated value P". When the computation is complete, the column controller 162 returns a "done" message to the column controller 152.

Control of the line stores 146 will now be described in further detail with reference to FIGS. 17 and 18. Interpolated data P' from the row interpolator is directed to any one of the five line stores 146, numbered 0 through 4, by applying a write signal to the line store while data is applied to the inputs of all the line stores simultaneously. Each of the line stores is a first-in first-out line memory that is capable of storing up to 4096 interpolated values of 17 bits each. The outputs from the line stores are selected one at a time by tri-state buffers 176 and supplied to the column ALU 148.

Figures 17, 18:
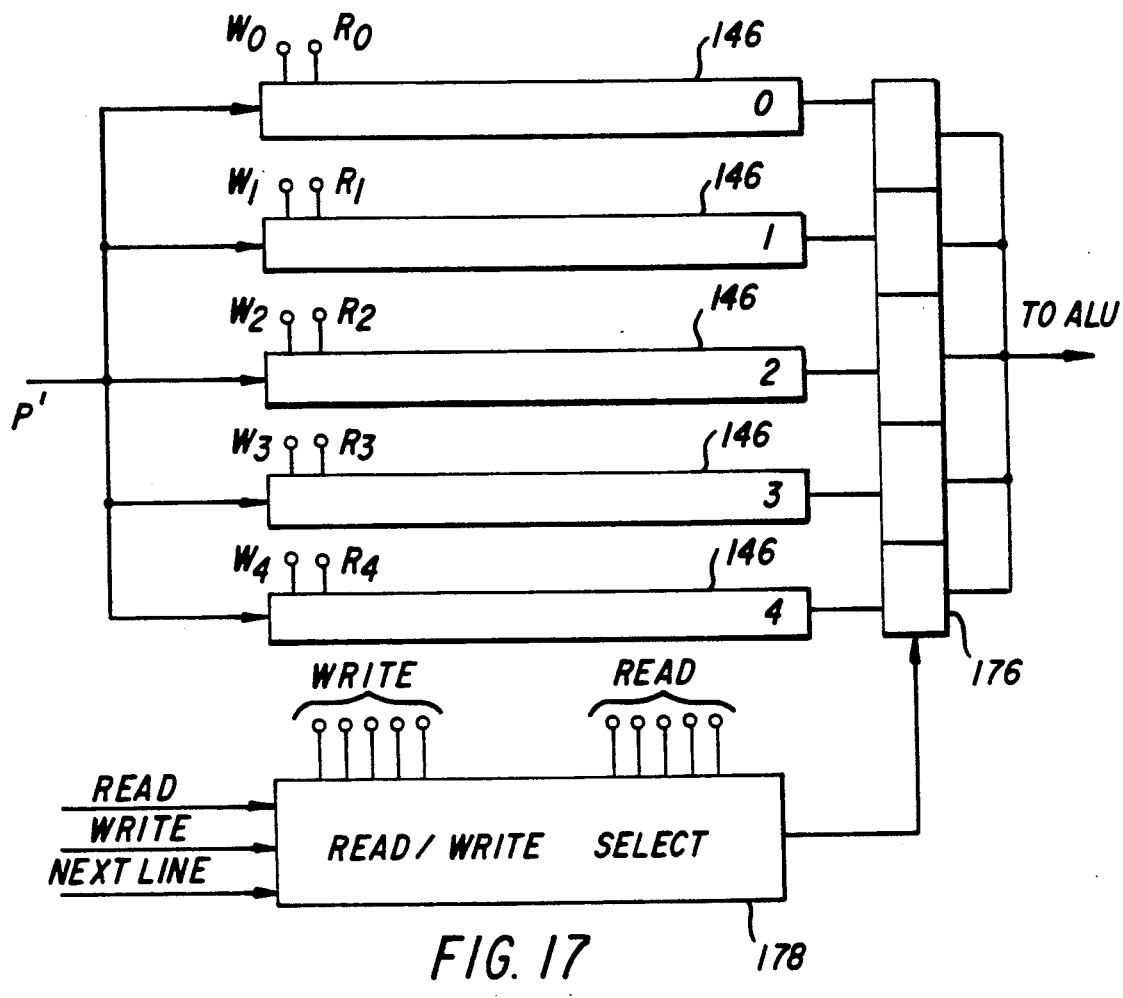
FIG. 17 is a block diagram showing the organization of the line stores in the column interpolator.
FIG. 18 is a table useful in describing the operation of the read/write select module associated with the line stores shown in FIG. 17.

The tri-state buffers 176 are controlled by a read/write select module 178 that applies the outputs of the line stores (numbered 0-4 in FIG. 17) to output the line according to the selection table shown in FIG. 18. Read and write signals are also applied to the line stores by the read/write select module according to the selection table shown in FIG. 18. Thus, while data is being written into line store 4, data is being serially read out of line stores 0, 1, 2, and 3. When a signal is received from the line store controller 150 to access the next line, the read/write select module 178 advances to the next row in the table shown in FIG. 18, and controls the line stores accordingly.

Figure 19:
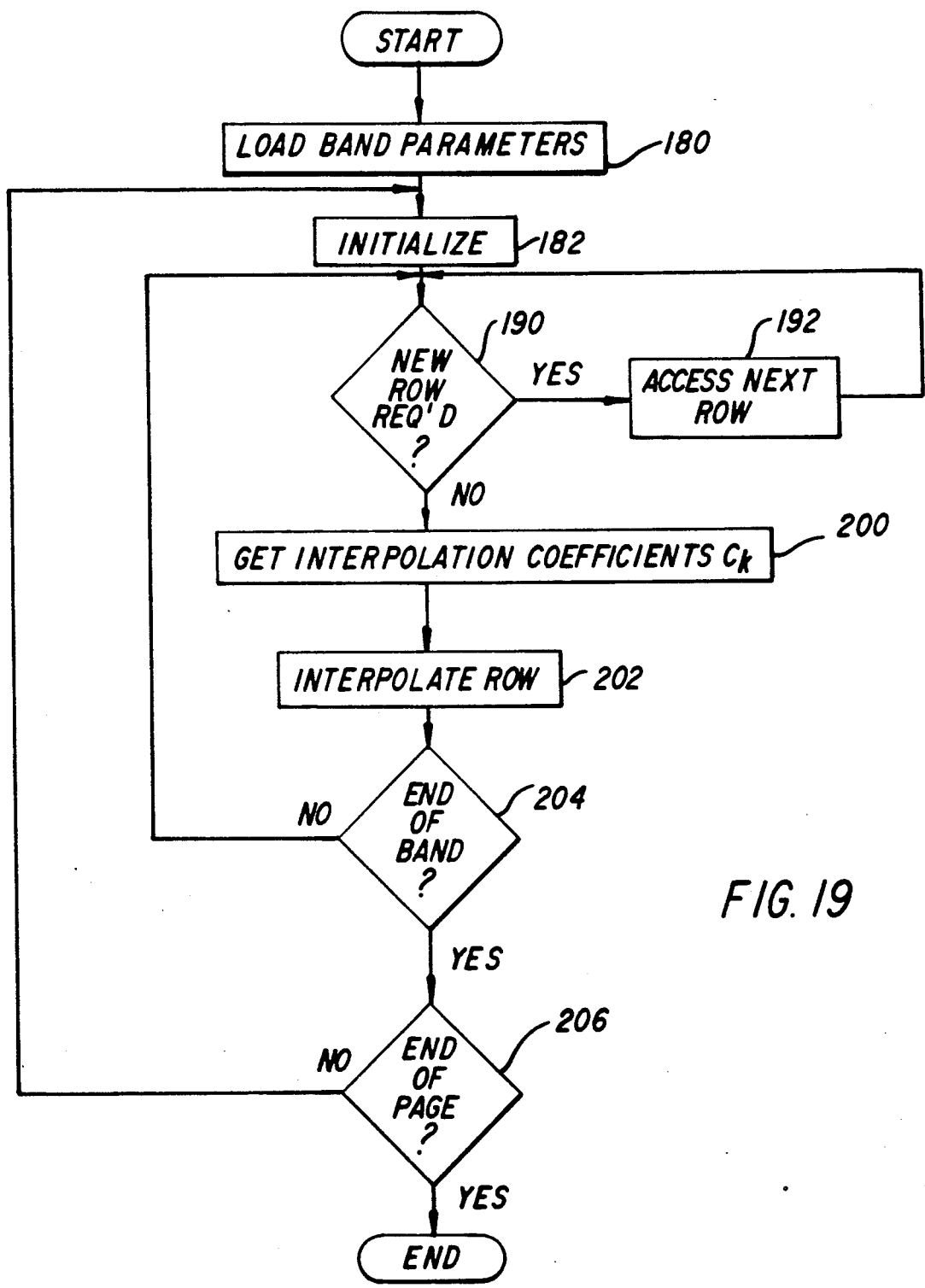
FIG. 19 is a flow chart showing the operation of the column controller.
Figure 20:
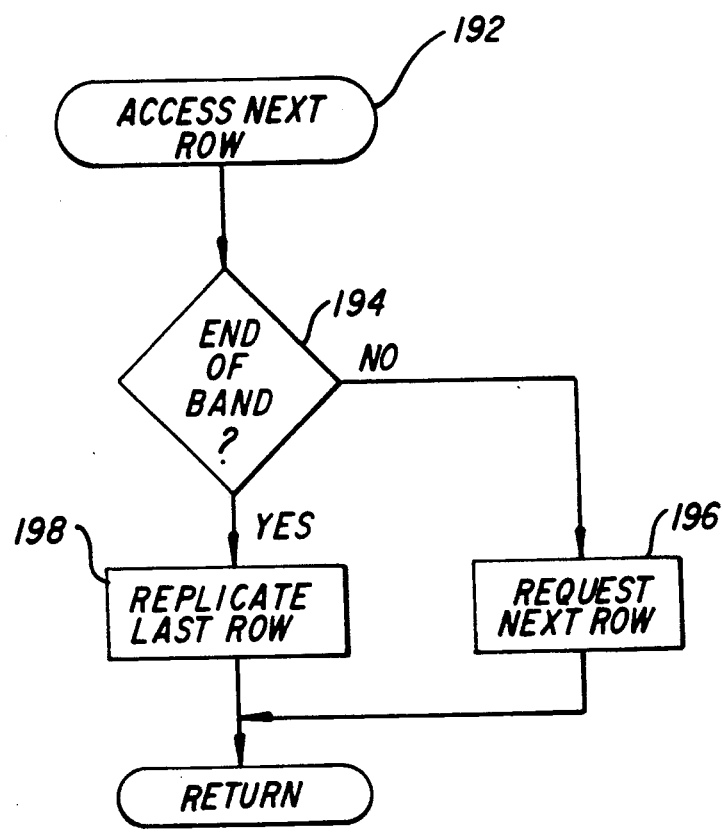
FIG. 20 is a flow chart showing the initialization function performed by the column controller.

The operation of the column controller 152 is shown in FIG. 19. First the column controller loads the band parameters (180) from the LCU 10, including the vertical output sampling increment $h_V$, the number of lines per band, the number of images per band, and the number of lines in the original image. Next, the column controller initializes (182) the data in the line stores by ordering the row interpolator 12 to perform row interpolation until 3 rows of interpolated data are read into line stores 0, 1, and 2. Similar to the initializing procedure performed for the row interpolator 12, the column interpolator duplicates the first row of data in an image so that rows of interpolated data between the first and second rows may be obtained. To accomplish this, the read/write select 178 addresses the tri-state buffers 176 for line 0 twice for each pixel in the first row of data. After the line stores are initialized (182) a check is made (190) to see if a new row of interpolated data is required. If so, the next row is accessed (192) by applying a signal to the read/write select module 178 that causes it to advance to the next configuration shown in FIG. 18, and a new row of interpolated data is ordered from the row interpolator 12. At the end of a band, the column interpolator 14 replicates the last line, up to 2 times as required to provide data to interpolate up to the last line of data values. This is accomplished as shown in FIG. 20. When the next row is accessed (192) a check is made 194 to see if this row being requested is the last one in the band. If not, the next row is requested normally (196) from the row interpolator 12. If this is the last row in the band, the last row is replicated up to two times (198) to provide interpolation data.

Returning to FIG. 19, if a new row of data is not required (190) the column controller computes the displacement address $d_v$ and sends the address to the lookup table 16 to return the interpolation coefficients $C_1-C_4$ (200). The column interpolator then interpolates a row of data (202) by successively sending four column wise data values from the four consecutive lines to the column ALU 148, and requesting the column ALU to compute the interpolated value P". At the end of the row, a check is made (204) to see if it is the end of the band. If not, control returns to see if a new row is required (190), and the cycle repeats. If it is the end of a band, a check is made 206 to see if it is the end of the page. If so, the page is not finished, control is returned to execute the next set of band parameters (180) for the next band. The band parameters are double buffered so that the interpolator can employ one set of parameters while the next set is being loaded.

Figure 21:
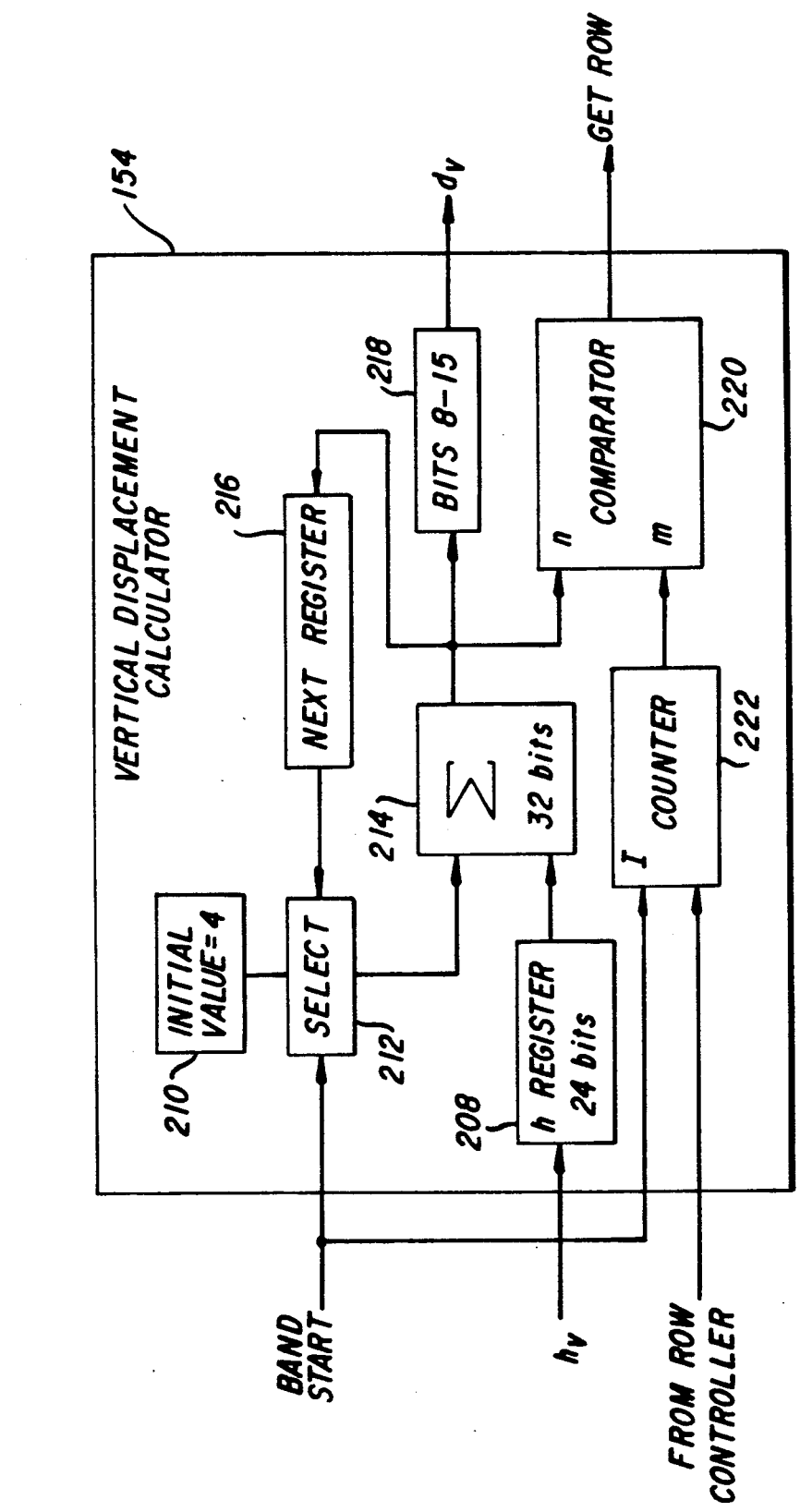
FIG. 21 is a block diagram showing the vertical displacement calculator portion of the column controller.

The column displacement calculator 154 which computes the displacement address for retrieving interpolation coefficients from lookup table 16, and determining when a new line of interpolated data is required from the row interpolator 12, is shown in FIG. 21. The logic of the column displacement calculator 154 is identical to the logic of the row displacement calculator 85 described above.

At the beginning of a band, the sampling increment $h_V$ is latched into a 24 bit data latch 208, and an initial value of 4 stored in a latch 210 is selected by selector 212. The initial value and the value of $h_v$ are summed by a summer 214. The sum is stored in a "next value" register 216, the contents of which are supplied to the summer 214 on the next and succeeding cycles to the end of the band. Bits 8-15 of the sum are extracted 218 and represent the displacement address $d_v$ that is applied to the lookup table 16 to retrieve the four interpolation coefficients $C_1$-$C_4$. The most significant 16 bits of the sum from summer 214 is applied to one input n of a comparator 220, and is compared with an accumulative count m from a counter 222 that is initialized to zero at the start of each band, and is incremented each time a new row of interpolated data is received from the row interpolator 12. As noted previously, the first row in a band is replicated to provide data for interpolating vertically between the first and second row of pixel data, and the last row of interpolated pixel values is replicated up to 2 times when the end of the band is reached. The column interpolator requests the row controller to supply a new row of pixel data until the value at the n input of comparator 220 equals the value at input m from counter 222. Thereafter, each time that n becomes greater than m, a new row of interpolated pixels is requested from the row interpolator. The displacement address d is a running multiple of $h_V$'s that increment each time a new row of values is interpolated, and is reset to zero at the beginning of each band.

INDUSTRIAL APPLICABILITY AND ADVANTAGES

The interpolator according to the present invention is useful for enlarging and reducing digital images such as diagnostic radiographs. The interpolator is advantageous in that a high resolution interpolation can be practically performed with a minimal size of coefficient memory. The invention has the further advantage that due to the reduced size of coefficient memory over the prior art two dimensional coefficient memory, several interpolation kernels may be stored in the memory, thereby providing the ability to easily switch between different types of interpolation.

We claim:

1. Digital image processing apparatus for performing two dimensional interpolation on a digital image expressed as rows and columns of pixel values, comprising:
   (a) an interpolation coefficient memory containing a plurality of one dimensional interpolation kernels for performing a plurality of interpolation types including cubic convolution, linear, and replication interpolation;
   (b) row interpolator means connected to said memory for receiving successive image pixel values along a row, retrieving interpolation coefficients from said memory, and producing interpolated pixel values by multiplying and summing the pixel values and interpolation coefficients;
   (c) column interpolator means connected to said row interpolator means and said memory for receiving rows of interpolated and noninterpolated pixel values from said row interpolator means, retrieving interpolation coefficients from said memory, and producing rows of interpolated pixel values by interpolating between groups of interpolated and noninterpolated pixel values in a column direction;
   (d) logic and control means for selecting one of said kernels in response to an operator input; and
   wherein said row interpolator means includes means for replicating the first and last pixel value in a row in an image, and said column interpolator means includes means for replicating the first and last rows of interpolated and noninterpolated pixel values in an image.

2. A method of processing a digital image comprising the steps of:
   selecting a format of an output digital image comprising at least first and second image bands, each of said bands having at least one digital image;
   determining first and second different interpolation parameters for said respective first and second image bands;
   processing a first digital image to be incorporated in said first image band of an output digital image with said first interpolation parameters;
   processing a second digital image to be incorporated in said second image band of said output digital image with said second interpolation parameters; and
   wherein said steps of processing said first and second digital images are effected by means of two-dimensional interpolation including:
   storing a plurality of one dimensional interpolation kernels for performing a plurality of interpolation types including cubic convolution, linear, and replication interpolation in an interpolation coefficient memory;
   performing row interpolation by receiving successive image pixel values along a row, retrieving interpolation coefficients from said memory, and producing interpolated pixel values by multiplying and summing the pixel values and interpolation coefficients;
   performing column interpolation by retrieving interpolation coefficients from said memory, and producing rows of interpolated pixel values by interpolating between groups of interpolated and noninterpolated pixel values in a column direction; and
   controlling the selection of one of said kernels in response to an operator input.

3. The method of claim 2 wherein said determining steps includes determining first and second different horizontal and vertical interpolation sampling increments for said respective first and second image bands and wherein said respective steps of processing said first and second digital images are effected with said determined first and second different horizontal and vertical interpolation and sampling increments.

4. The method of claim 2 wherein said selecting step includes selecting an output digital image formed which further includes a text band having text and including the step of processing said text to be incorporated in said text band by means of replication interpolation.

5. the apparatus claimed in claim 1, wherein said interpolation coefficient memory is divided into a plurality of banks adapted to be addressed simultaneously to return a plurality of interpolation coefficients, one such coefficient from each of said banks.

6. The apparatus claimed in claim 1, wherein said row interpolator means further comprises row controller means for requesting pixel values from a frame store memory and interpolation coefficient values from the coefficient memory, and row arithmetic and logic unit (ALU) means for receiving the pixel values and the coefficient values, and performing multiplication summation according to the formula $P' = (P_1 \times C_1) + (P_2 \times C_2) + (P_3 \times C_3) + (P_4 \times C_4)$ where $P'$ is an interpolated value, $P_i$ are the pixel values and $C_i$ are the coefficient values.

7. The apparatus claimed in claim 6, wherein said row ALU means comprises a four element input register for receiving said pixel values serially, a four element working register coupled to said input register for receiving said pixel values in parallel from said input register, a four element coefficient register for receiving interpolation coefficients in parallel from said coefficient memory, and multiply accumulation means coupled to said working register and said coefficient register for receiving said pixel values and coefficient values in pairs, multiplying them, and accumulating the sum of their products.

8. The apparatus claimed in claim 1, wherein said column interpolator means further comprises line store means for receiving rows of interpolated and noninterpolated pixel values from said row interpolator, line store control means for controlling the addressing of said line stores, ALU means for retrieving interpolated and noninterpolated pixel values from said line stores, and interpolating between the rows in a column direction, and column controller means for controlling the column interpolator means.

9. The apparatus claimed in claim 8, wherein said column ALU means comprises a 4 element coefficient register for receiving, in parallel, four interpolation coefficients from the coefficient memory and delivering them serially, and column multiply and accumulation means connected to said coefficient register and having inputs for receiving successive pixel values and coefficient values, and for performing a multiplication and summing the products to produce an interpolated pixel value according to the equation $P''=(P'_{1,1} \cdot C_1)+(P'_{1,2} \cdot C_2)+(P'_{1,3} \cdot C_3)+(P'_{1,4} \cdot C_4)$ where $P''$ is the interpolated pixel value between rows of pixels, $P'_{ij}$ is the $i^{th}$ pixel value from the $j^{th}$ row of interpolated values, and $C_k$ are the interpolation coefficients.

10. The apparatus claimed in claim 8, wherein said line store means comprises five first-in first-out line memories, multiplexing means for coupling the outputs of said memories in groups of 4 to the ALU means, and read/write select means for controlling said multiplexing means and for controlling the data written into said line store means.

* * * * *